Oct. 29, 1963  C. A. CHAYNE ETAL  3,108,650
SINGLE LEAF SPRING SEMI-SWING AXLE SUSPENSION
Filed May 31, 1960  2 Sheets-Sheet 2
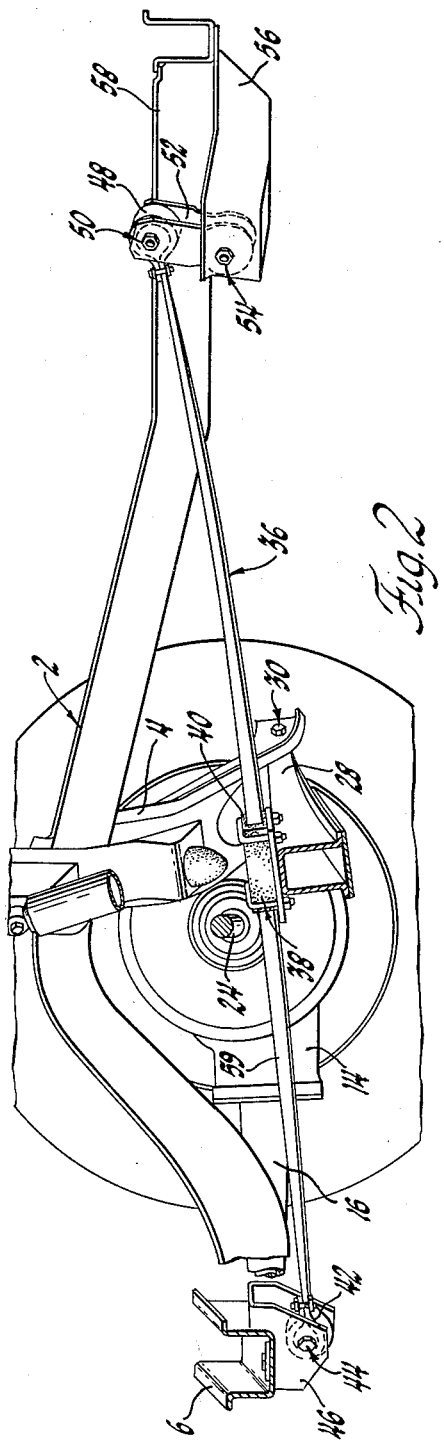
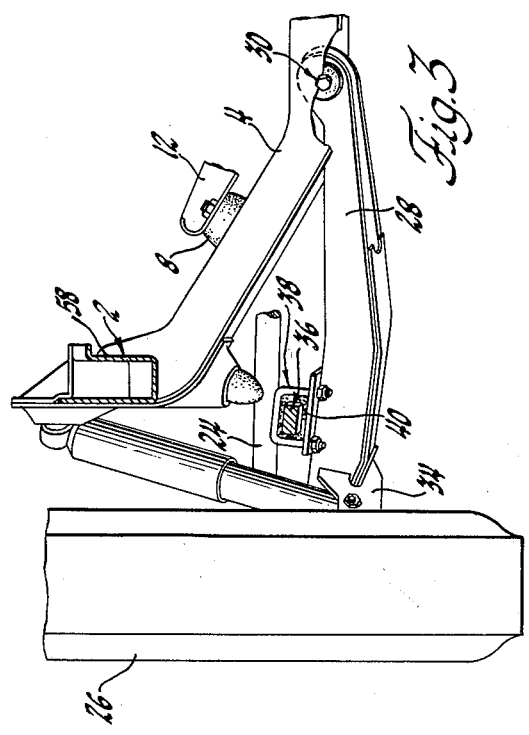
INVENTORS
Charles A. Chayne &
BY Von D. Polhemus
W. J. Wagner
ATTORNEY

United States Patent Office 3,108,650
Patented Oct. 29, 1963

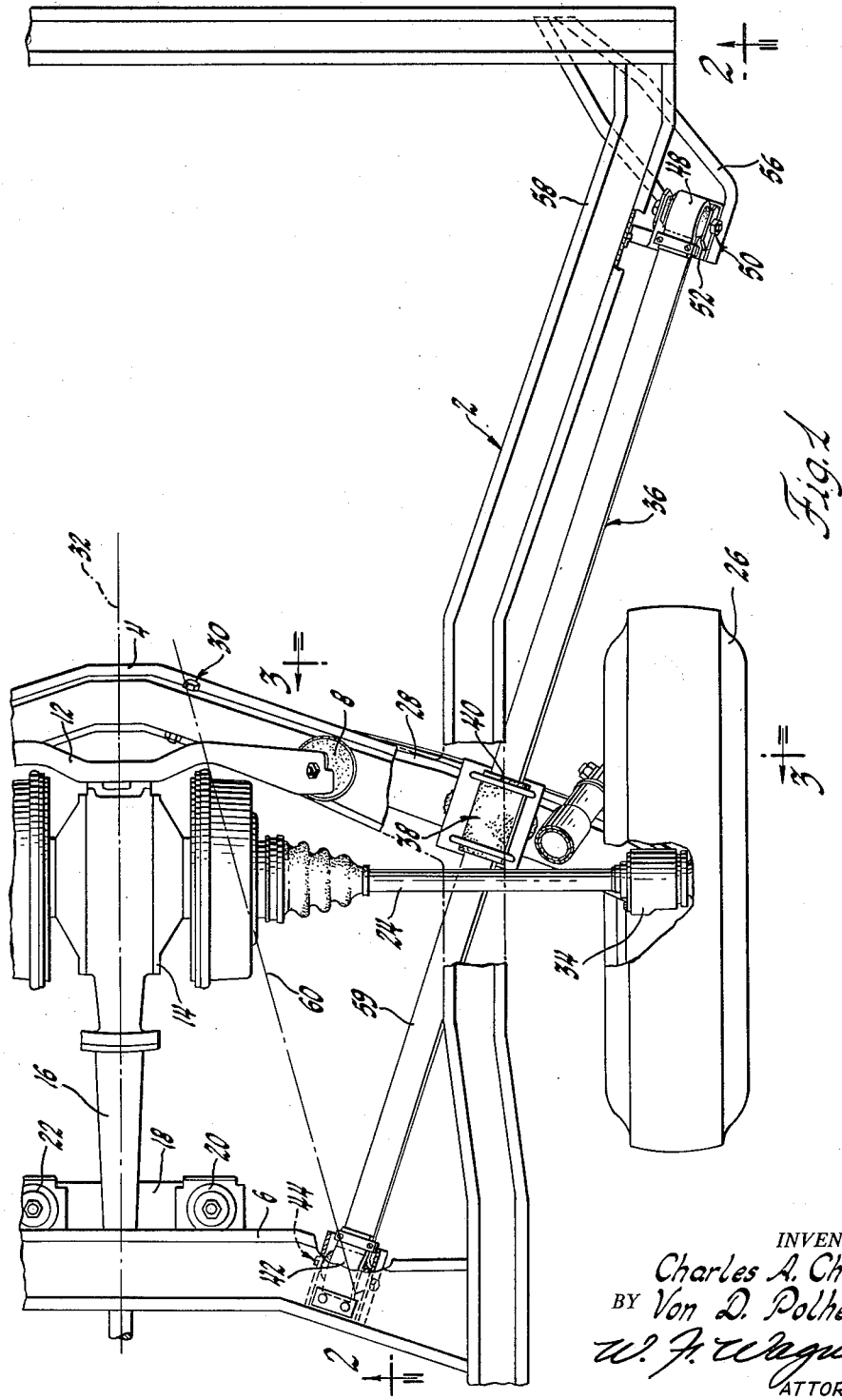

3,108,650
SINGLE LEAF SPRING SEMI-SWING AXLE
SUSPENSION
Charles A. Chayne, Bloomfield Hills, and Von D. Polhemus, Franklin, Mich., assignors to General Motors Corporation, Detroit, Mich., a corporation of Delaware
Filed May 31, 1960, Ser. No. 32,783
5 Claims. (Cl. 180—73)

This invention relates to vehicle suspension and more particularly to swing axle type independent rear wheel suspension.

An object of the present invention is to provide an improved vehicle suspension.

Another object is to provide an independent rear wheel suspension for vehicles wherein the wheels are guided by a control arm arrangement which is formed in part by a rigid transversely extending link and in part by the elastic medium of the suspension.

Still another object is to provide an arrangement of the stated character wherein the elastic medium is in the form of a single leaf semi-elliptic spring.

Yet a further object is to provide a suspension of the type described wherein the single leaf spring is formed and arranged with reference to the vehicle sprung mass so that a portion of the spring forms a structural portion of the control arm arrangement.

Yet another object is to provide a suspension of the stated character wherein the leaf spring is disposed obliquely with reference to the vehicle longitudinal centerline so that the effective axis of motion of the wheel lies along an imaginary line which diverges forwardly relative to the vehicle centerline at approximately a 20° angle.

Still a further object is to provide an arrangement of the type described wherein the spring and link are perpendicular to each other in plan and the rearwardmost end of the spring is located outboard of the vertical longitudinal plane of the associated wheel.

These and other objects, advantages, and features of the invention will become more fully apparent as reference is had to the accompanying specification and drawings wherein:

FIG. 1 is a partial plan view, partly in section and with parts broken away, illustrating a rear suspension construction in accordance with the present invention;

FIG. 2 is a side elevational view, partly in section and with parts broken away, looking in the direction of arrows 2—2 of FIG. 1; and FIG. 3 is a fragmentary rear end elevational view looking in the direction of arrows 3—3 of FIG. 1.

Referring now to the drawings and particularly FIG. 1, reference numeral 2 designates generally the vehicle frame or sprung mass which includes a cross member 4 and 6. Resiliently attached to cross member 4 by elastic mount 8 and an identical transversely opposite mount, not shown, is a transversely extending bracket 12 which in turn supports the rear end of a conventional differential structure 14. The forward or input end 16 of differential structure 14 in turn is resiliently supported on cross member 6 by a bracket 18 and elastic mounts 20 and 22. Articulatably attached to differential 14 by a universal joint (not shown) and extending laterally outwardly therefrom is a driving half axle 24, the outboard end of which is positively connected to driving wheel 26.

In accordance with the general features of the invention, wheel 26 is guided with reference to the sprung mass by means of a control arm arrangement which includes a generally transversely extending hollow rigid arm or link 28. As seen best in FIG. 3, arm 28 is pivotally connected at its inboard end to cross member 4 by a rubber bushed pin joint 30 which is located rearwardly of and below half axle 24, and spaced slightly inboard of the vehicle longitudinal centerline 32. At its outboard end, arm 28 is connected to a supporting bracket 34 in which is mounted bearing means, not shown, for rotatably supporting the outer end of axle 24 and wheel 26.

In accordance with one feature of the invention, the control arm arrangement also includes a single leaf spring 36 which is obliquely disposed in plan view so that it forms a 90° angle with arm 28 and converges forwardly relative to the vehicle centerline 32. Spring 36 is connected intermediate its ends to the upper surface of control arm 28 by means of a clamp assembly 38 which includes a rubber lined sleeve 40 surrounding the body of spring 36. At its forward end, spring 36 is formed with a loop or eye 42 which surrounds a rubber bushed pin joint 44 secured to a depending bracket 46 mounted on cross frame member 6. The rearward end of spring 36 in turn is formed with an eye 48 which surrounds a rubber bushed pin joint 50 carried by the upper end of a tension shackle 52. The lower end of shackle 52 is in turn carries a rubber bushed pin joint 54 which is connected to an outrigger bracket 56 mounted on frame side rail 58. As seen best in FIG. 2, tension shackle 52 is swingable about joint 54 to accommodate foreshortening of spring 36 during deflection thereof in the conventional manner. However, in the illustrated embodiment, the pivotal connection 44 at the forward end of spring 36 and the pivotal connections 50 and 54 associated with shackle 52 preferably include annular rubber bushing portions of cross section sufficient to allow substantial lateral rocking deflection of the spring relative to the pivot pins 44, 50, and 54, and thus maintain torsional and lateral bending stress on the spring at a minimum level.

As seen best in FIG. 1, control arm 28 and the portion 59 of spring 36 extending between clamp 38 and cross member 6 form a generally V-shaped control arm assembly which is adapted to oscillate about an imaginary axis 60 extending between the geometric centers of pivot connection 44 and pivot connection 30. Therefore, in addition to serving as the elastic medium for supporting the sprung mass of the vehicle relative to wheel 26, spring 36 also forms a major structural element of the complete control arm assembly. In addition to the combined structural and elastic functions thereof, the oblique disposition of spring 36 also permits establishment of the imaginary axis 60 so that vertical deflection of wheel 10 occurs about an axis which forms an angle of approximately 20° to the vehicle centerline, thereby causing wheel 26 to toe-in progressively during compression deflection and toe-out during rebound deflection and thus cause each rear wheel to assume an understeer angle when the vehicle is in a roll condition negotiating a curve.

In addition to the foregoing function, the oblique disposition of spring 36 also assists in reducing lateral bending deflection of the spring incident to vertical wheel deflection owing to the fact that all lateral inward movement of the portion of the spring clamped to arm 28 occurs in a vertical plane perpendicular to imaginary axis 60 and intersecting the geometric center of clamp 38. Since the lateral inward movement of the clamp during wheel deflection forms an obtuse angle relative to the vertical plane of action of rear spring shackle 52, pure lateral bending loads on spring 36 are avoided and the spring is allowed to function primarily in vertical bending deflection.

From the foregoing, it will be seen that the present invention not only provides distinctly beneficial geometric characteristics in a swing axle supsension, but in addition also allows substantial simplification and cost reduction thereof by utilization of a portion of the spring as a structural component of the wheel control arm. As a result, a simple, efficient and economical swing axle suspension construction is obtained.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In a motor vehicle having a differential forming part of the sprung mass and driving wheels independently deflectable relative thereto, half axles operatively connecting said wheels and differential, guiding means for each of said wheels comprising a laterally and forwardly extending rigid arm pivotally connected at its inboard end to said sprung mass rearwardly of and below the adjacent half axle, means at the outer end of said arm rotatably supporting said wheels, a leaf spring having its intermediate portion clamped to said arm near the outer end thereof, a compression shackle connecting the rear end of said spring to said sprung mass outboard of the vertical inboard longitudinal plane of said wheel, and pivot means connecting the forward end of said spring to said sprung mass inboard of said intermediate connection.

2. In a motor vehicle having a differential forming part of the sprung mass and driving wheels independently deflectable relative thereto, half axles operatively connecting said wheels and differential, guiding means for each of said wheels comprising a laterally and forwardly extending rigid arm pivotally connected at its inboard end to said sprung mass rearwardly of and below the adjacent half axle, means at the outer end of said arm rotatably supporting said wheels, a single leaf spring having its intermediate portion clamped to said arm near the outer end thereof, a compression shackle connecting the rear end of said spring to said sprung mass outboard of the inboard vertical longitudinal plane of said wheel, and pivot means connecting the forward end of said spring to said sprung mass inboard of said intermediate connection.

3. The structure set forth in claim 2 wherein said arm and said spring are disposed at right angles.

4. The structure set forth in claim 2 wherein said shackle is located vertically above the axis of the associated half axle.

5. The structure set forth in claim 2 wherein said pivot means at the forward end of said spring is located below the pivot means at the inboard end of said arm and the shackle is located above said last mentioned pivot means.

References Cited in the file of this patent

UNITED STATES PATENTS

| 2,053,869 | Haltenberger | Sept. 8, 1936 |
| 2,055,975 | Haltenberger | Sept. 29, 1936 |
| 2,741,493 | Matthias | Apr. 10, 1956 |
| 2,762,445 | Polhemus et al. | Sept. 11, 1956 |
| 2,815,084 | Fortgang et al. | Dec. 3, 1957 |
| 2,950,774 | Eyb | Aug. 30, 1960 |

FOREIGN PATENTS

| 920,109 | Germany | Nov. 11, 1954 |